Figure 1:
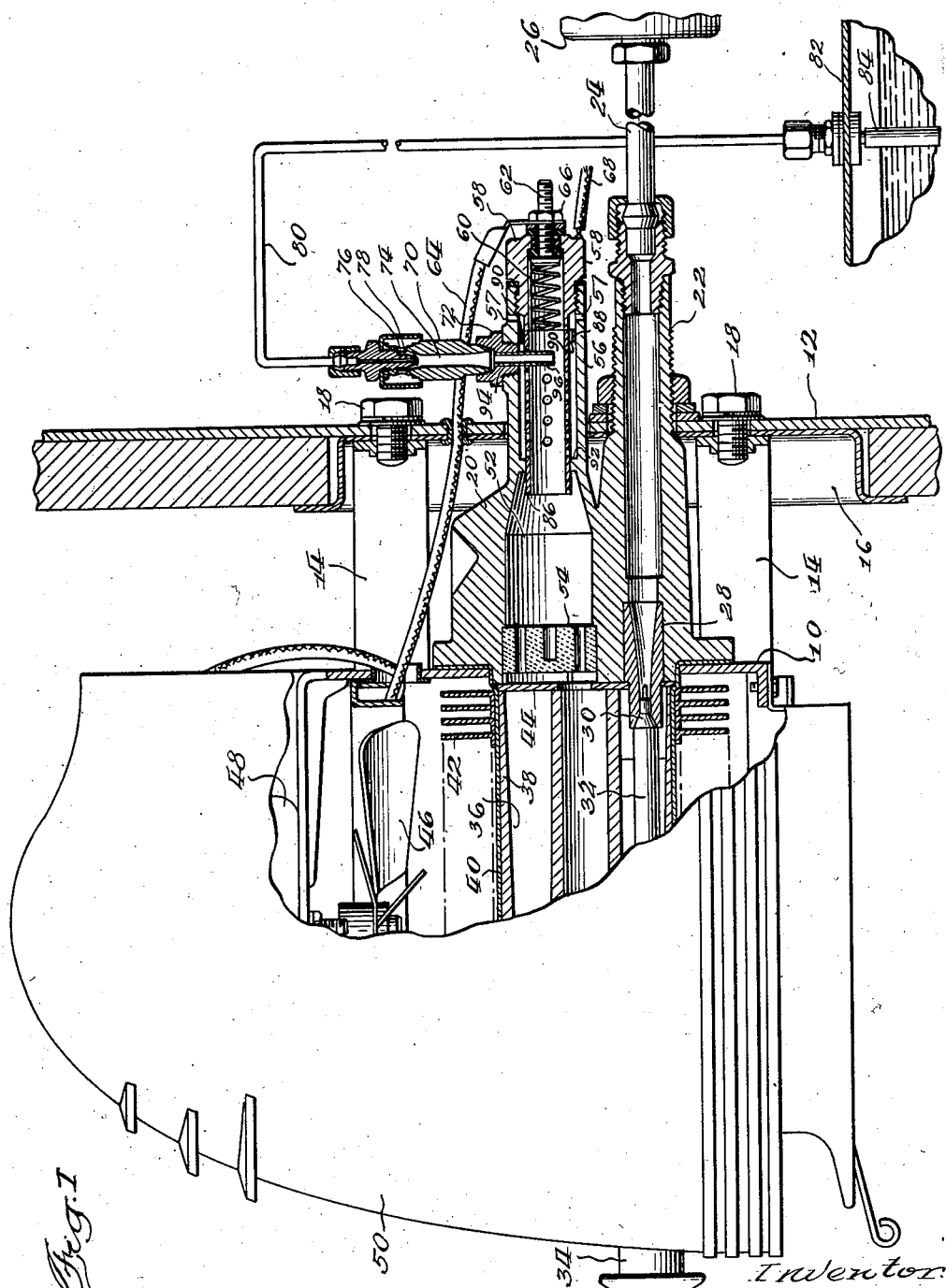

April 17, 1945.  H. J. DE N. McCOLLUM  2,373,766
AUTOMOBILE HEATER
Original Filed April 6, 1938    2 Sheets-Sheet 1

April 17, 1945. H. J. DE N. McCOLLUM 2,373,766
AUTOMOBILE HEATER
Original Filed April 6, 1938 2 Sheets-Sheet 2
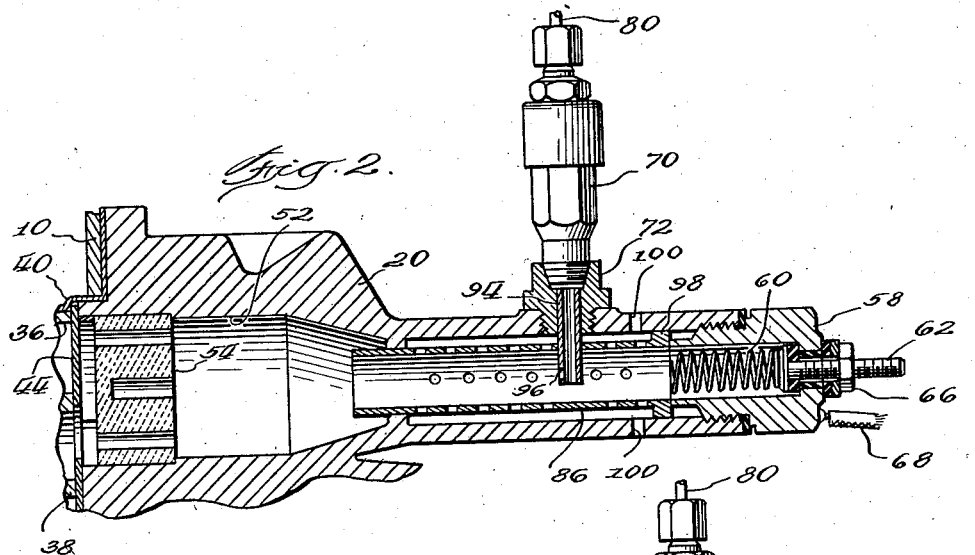
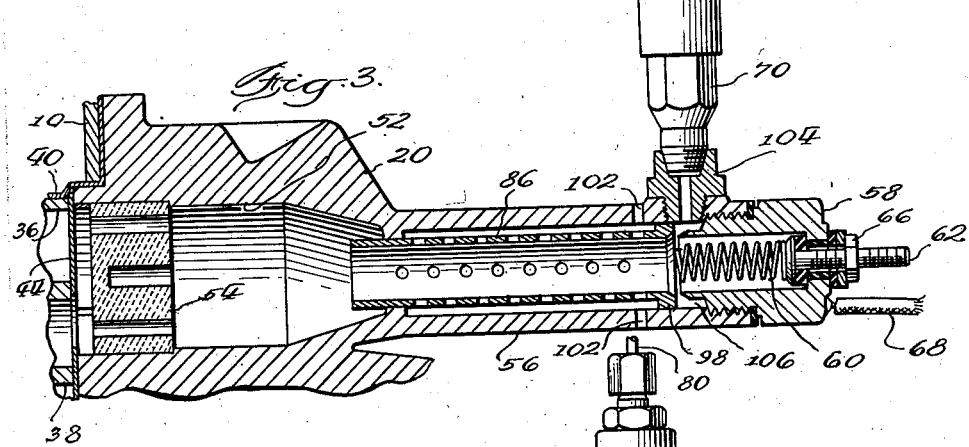
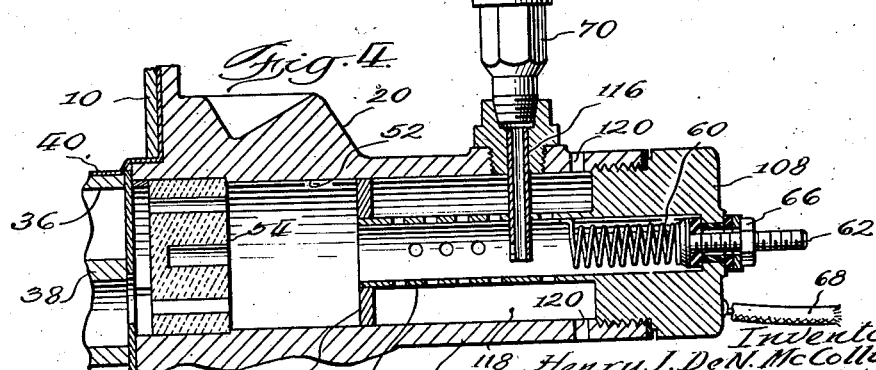

Patented Apr. 17, 1945

2,373,766

UNITED STATES PATENT OFFICE 2,373,766

AUTOMOBILE HEATER

Henry J. De N. McCollum, Chicago, Ill.; Thelma McCollum executrix of said Henry J. De N. McCollum, deceased Original application April 6, 1938, Serial No. 200,316. Divided and this application July 20, 1940, Serial No. 346,600

4 Claims. (Cl. 158—28)

My invention relates generally to automobile heaters, and more particularly to heaters of the internal combustion type. My invention pertains to an automobile heater of the general type disclosed and claimed in my Patent No. 2,191,173, issued February 20, 1940, and this application is a division of my copending application Serial No. 200,316, filed April 6, 1938, now Patent No. 2,260,535, issued October 28, 1941.

In my aforesaid copending application is disclosed an automobile heater of the internal combustion type in which it is desirable to admit to the combustion chamber an auxiliary supply of air. The particular fuel and air admitting means devised by me for accomplishing this result form the subject matter of the present invention.

One of the objects of my invention is the provision of an improved combustion chamber for internal combustion heaters for automobiles and the like.

Another object of the invention is the provision of an improved combustion chamber and means for supplying fuel to the combustion chamber of an internal combustion heater.

Another object of the invention is the provision of an improved combustion chamber and means for supplying fuel and an auxiliary supply of air to the combustion chamber of an internal combustion heater.

Other objects will appear from the following description, reference being had to the accompanying drawings, in which:

Fig. 1 is a fragmentary central vertical sectional view of an automobile heater incorporating my improved form of combustion chamber and fuel admitting mean; and, Figs. 2 to 4 inclusive show further modified forms of combustion chambers, fuel and air admitting means, and ignition means for use in automobile heaters, each being a fragmentary central vertical sectional view.

The improved combustion chambers of my invention may be incorporated in a heater of the general type shown in Fig. 1, which comprises a frame plate 10 which is mounted upon the dash 12 of a vehicle by means of brackets 14, a heat radiating plate 16 and cap screws 18. A combustion chamber casting 20 is secured to plate 10 and is provided with a tubular outlet projection 22 which is connected by means of a suitable conduit 24 with the intake manifold 26 of an automobile engine or with any other suitable source of suction. The rate of flow of gases of combustion to the intake manifold is determined by a flow restricting nozzle 28 having a Venturi-shaped passageway extending therethrough, the mouth of the nozzle 28 forming a seat for a valve 30 at the end of a valve stem 32.

The valve stem 32 is manually operated by means of a handle button 34 secured at the end opposite the valve 30. The valve 30 is located adjacent the outlet end of a circuitous passageway 36 formed in a radiator casting 38. The latter casting is surrounded by a copper shell 40 over which flanged heat radiating fins 42 are pressed.

An apertured baffle plate 44 covers the ends of the sections of the passageway 36. Air from the passenger compartment of the vehicle is forced downwardly past the fins 42 by means of a fan 46 operated by an electric motor 48. The motor, fan, and radiator are enclosed in a suitable housing 50.

The casting 20 contains a combustion chamber 52, generally cylindrical in shape, the outlet end of which is formed by a reigniter plug 54, which is made of a suitable refractory ceramic material.

Cast integrally with the casting 20 is a tubular extension 56 which forms the inlet to the combustion chamber 52. Near its outer end, the tubular extension 56 is provided with a plurality of inlet ports 57 and the open end of the tube is closed by an igniter plug 58, which is threaded into the end of the extension. Within the igniter plug is an igniter element 60 comprising a coil of suitable high resistance wire with one end of the coil welded to the plug 58 and the other end welded to a terminal 62 which is suitably insulated from the plug 58. An insulated wire 64 is secured to the outer end of the terminal 62 by a nut 66 and is connected through suitable switching means with a source of electrical energy, usually the storage battery of the vehicle upon which the heater is mounted. The plug 58 is grounded by means of a wire 68 welded thereto.

A carbureting device 70 is secured to the tubular extension 56 by a fitting 72. The carbureting device 70 may be of any simple conventional construction, and is herein disclosed as having a Venturi-shaped passageway 74, to which air is supplied from the atmosphere through ports 76 and gasoline or other liquid fuel is supplied through a jet 78, the nozzle of which terminates adjacent the throat of the passageway 74. Fuel is supplied to the jet 78 through a conduit 80 which is connected to a suitable container 82 of liquid fuel, which, in most instances, will be the float bowl of the engine carburetor, but may be a suitable auxiliary reservoir for gasoline or other fuel.

A suitable device 84 for assuring an adequate supply of fuel during the starting period is preferably provided so as to facilitate the ignition of the fuel mixture in the combustion chamber by enriching this mixture during the initial period of operation.

The carbureting device 70 supplies a mixture of fuel and air which is unnecessarily rich, and I have therefore provided an auxiliary air inlet for supplying air at the rate required to effect most efficient combustion. This means comprises a perforated preheating tube 86 secured in the tubular extension 56 by a press fit. The tube 86 has a flange 88 engaging the walls of the bore of the tubular extension 56, the flange 88 also having a plurality of passageways 90 extending therethrough. The inner end of the tube 86 is held in position by an inwardly projecting shoulder 92 formed integrally with the casting 20. The fuel and air mixture is supplied from the carbureting device 70 to the interior of the tube 86 through a tube 94 pressed into the fitting 72 and projecting into the interior of the preheating tube. The tube 94 has a radial opening 96 located approximately at the axis of the tube 86.

In operation, the handle button 34 is pulled outwardly, whereupon the suction commences drawing a mixture of fuel and air from the carbureting device 70, the suction caused in the Venturi-shaped passageway 74 of the latter being effective to create suction in the jet 78 and thereby raise the liquid fuel from the fuel supply reservoir 82.

By suitable means, not herein disclosed, the electrical igniter contained within the igniter plug 58 is electrically heated during such period as is necessary to assure ignition of the fuel mixture being supplied to the combustion chamber. The mixture in the combustion chamber will thus be ignited and the products of combustion will flow through the passageways in the reigniter plug 54, through the circuitous passageway 36 in the radiator casting 38, and hence past the open valve 30, through the conduit 24 into the intake manifold 26. It will be noted that the coil of wire 60 is not in the direct path of either the supply of auxiliary air or the supply of mixture of fuel and air, and may thus be heated to the temperature at which it will ignite the mixture in a relatively short time with a minimum consumption of electrical energy.

As previously stated, the device 84 is effective to supply fuel at an increased rate for a short period after the operation of the heater has been initiated and at a lesser rate thereafter.

To increase the combustion efficiency of the device, it is desirable to admit additional air to the combustion chamber, and this is accomplished by means of tube 86. The mixture of fuel and air provided by the carbureting device 70 connected to the conduit 80 flows through the tube 94 in fitting 72 into the preheating tube 86, where it is mixed with the auxiliary supply of air which is sucked through the ports 57, holes 90, and the apertures in the tube 86. The incoming auxiliary air adds turbulence to the flow of the mixture, and thus assures a complete mixture, and results in rapid vaporization of any liquid fuel particles which may have been carried with the air in unvaporized condition. Since the tube 86 is jacketed by the relatively cool auxiliary air supply, the tube will not become excessively hot. As a result, any drops of unvaporized fuel will, due to adhesion, spread over the inner surface of the tube, and thus present a large surface over which evaporation may take place. If the tube 86 becomes very hot, drops of fuel falling upon it would maintain their spherical shape, just as a drop of water falling upon a hot stove, and the drop would roll into the combustion chamber. A drop of liquid falling upon a hot surface is more or less insulated from the surface by the vapor formed at the point of contact, and the rate of heat transmission from the hot surface to the liquid is thus lower than if the surface were cool enough to permit the liquid to spread over the surface.

After a short period of operation, the reigniter plug 54 will become heated to a sufficiently high temperature to assure reignition of the combustible mixture being fed to the combustion chamber, should the flame become extinguished accidentally, due to a temporary drop in the intake manifold vacuum, as may occur upon sudden acceleration of the automobile. It is therefore unnecessary that the electrical igniter be electrically heated through the period of operation, and for this reason, thermostatically operating switch means may be provided in the electrical igniter circuit to open the circuit when the temperature of the heater attains its normal operating value. Such means are disclosed in my Patent No. 2,191,174, issued February 20, 1940, as well as my Patent No. 2,191,173, issued February 20, 1940. As disclosed in these patents, the thermostatic means may also control the supply of current to the motor 48, and thereby cause operation of the fan and circulation of the air in the passenger compartment of the vehicle only after the heater has attained substantially its normal operating temperature.

The constructions as shown in Figs. 2 to 4 inclusive are modified forms of combustion chambers and auxiliary air admission devices, and are intended to be utilized in combination with the remaining elements of the heater shown in Fig. 1. Various parts of the construction shown in Figs. 2 to 4 inclusive have therefore been given reference characters similar to those of the corresponding parts illustrated in Fig. 1, wherever the parts bear such similarity.

The modification shown in Fig. 2 is similar to the construction shown in Fig. 1, and similar parts have therefore been given similar reference characters. The flange 98 on the tube 86 is, however, not perforated, as is the flange 88, and the auxiliary air inlet bores 100 are located to the left (Fig. 2) of the flange 98 instead of to the right of the corresponding flanges 88 of the construction shown in Fig. 1. In this way, the auxiliary air does not tend to cool the end of the igniter plug 58, and as a result, the ignition of the charge by the igniter coil 60 is accomplished more effectively.

It will be noted, moreover, that the point of admission of the mixture of fuel and air is spaced a greater distance from the igniter coil 60, so that there is less possibility of turbulent currents of air coming into contact with the igniter coil and preventing it from being rapidly heated to its temperature of incandescence.

In the construction shown in Fig. 3, the igniter plug 58 is, as in Figs. 1 and 2, screwed into the end of the tubular extension 56 of the combustion chamber casting 20. The supply of auxiliary air is admitted through inlet openings 102 which are located forwardly of the flange 98 of the perforated tube 86, and the supply of the fuel mixture received from the carbureting device 70 is fed through a fitting 104 to an annular space 106 surrounding the inner end of the igniter plug 58. The latter is spaced a short distance from the end of the tube 86 so as to provide a passageway for the flow of the combustible mixture into the tube 86. The flow of the combustible mixture is, however, directed away from the igniter plug 58 and the igniter coil 60, so that the latter may be heated to the necessary temperature to cause ignition of the mixture. The charge entering the space 106 is slightly heated by contact with the end of the igniter plug 58, and ignition of the charge is thereby facilitated.

In Fig. 4, the igniter plug 108 is threaded in the end of an enlarged tubular projection 110 of the combustion chamber casting 20 and has a relatively large bore in which is located a perforated tube 112 which has a partition member 114 at its inner (lefthand, Fig. 4) end, which may be in the form of a flange formed integrally with the tube 112, or in the form of an annulus pressed over the tube and contacting walls of the bore in the tubular projection 110. If desired, the tube 112 may be made integral with the igniter plug 108. As in the construction shown in Fig. 2, the supply of combustible fuel is fed through a tube 116 which projects through the tube 112 and terminates substantially at the axis of the latter. Auxiliary air is admitted to the space 118 through a plurality of bores 120 formed in the tubular extension 110. The air in space 118 is heated by the walls of the projection 110 and also, during starting, by the heat transmitted from the igniter coil 60. While the air is being heated, the tube 112 is correspondingly cooled so that, should any vaporized drops of fuel be supplied through the tube 116, such fuel will spread over the surface of the inside of the tube 112, and thus vaporize more readily than if the tube were very hot.

While I have shown and described my invention as embodied in a variety of forms, it will be apparent to those skilled in the art that the invention may be utilized in other forms of construction. I therefore desire, by the following claims, to include within the scope of my invention not only the constructions herein disclosed, but also such other embodiments of the invention whereby substantially the same results may be obtained by equivalent means.

I claim:

1. In an automobile heater of the internal combustion type, the combination of a body having a combustion chamber formed therein and a tubular extension integral therewith communicating with said combustion chamber, suction means for withdrawing the products of combustion from said chamber, a flanged tube in said tubular extension coaxial therewith of external diameter less than the internal diameter of the tubular extension and extending into said combustion chamber, said tube and flange having perforations therein, means to supply a mixture of fuel and air to said tube for transmission therethrough to said combustion chamber, an electrical igniter secured in the outer end of said tubular extension and having a reduced end abutting the flange of said perforated tube and forming an annular passageway within said tubular extension, said tubular extension having therein ports in communication with said annular passageway for admitting atmospheric air to the space between said tube and said tubular extension.

2. In an automobile heater of the internal combustion type, the combination of a body of heat conducting material having a combustion chamber formed therein, suction means for withdrawing products of combustion from said chamber, a tubular extension formed integrally with said body, said extension forming the inlet to said chamber and being of lesser cross sectional area than said combustion chamber, a perforated tube of external diameter less than the internal diameter of said extension, means securing said tube in said extension coaxially with respect to the latter, means to supply a mixture of fuel and air to said tube for transmission therethrough to said combustion chamber, a plug type electrical igniter having a resistance element open to said tube threaded into the outer end of said tubular extension, and ports through said tubular extension for admitting atmospheric air to the space between said tube and said tubular extension at a point between said igniter and said combustion chamber.

3. In an automobile heater of the internal combustion type, the combination of a casting having a combustion chamber formed therein, a tubular extension formed integrally with said casting, said extension having a bore therethrough communicating with said combustion chamber and forming the inlet thereto, said bore in said extension being of lesser cross sectional area than said combustion chamber, suction means for withdrawing the products of combustion from said chamber, a perforated tube within said extension, spaced from the walls thereof, and extending into said combustion chamber, means for securing said tube in said extension, a carbureting device for supplying a mixture of fuel and air to said tube for transmission therethrough to said combustion chamber, an electrical igniter secured at the outer end of said tubular extension and inlet ports located between said igniter and said carbureting device for admitting atmospheric air to the space between said tube and said tubular extension.

4. In an internal combustion automobile heater having a body with a combustion chamber formed therein and suction means for withdrawing the products of combustion from said combustion chamber, the combination of a tubular extension formed on said body adjacent said chamber, said extension being of lesser cross sectional area than said combustion chamber, an annular shoulder at the inner end of said extension, a flanged perforated tube of external diameter less than the internal diameter of said extension, said tube being supported in said extension on said shoulder and said flange coaxially with said extension and with its walls spaced from the inner walls of said extension and extending into said combustion chamber, means for supplying a mixture of fuel and air to said perforated tube for transmission therethrough to said combustion chamber, an electrical igniter secured in said tubular extension adjacent the outer end of said perforated tube, and means for admitting atmospheric air to the space between said tube and said tubular extension at a point between said igniter element and said fuel supply means.

HENRY J. DE N. McCOLLUM.